United States Patent Office 3,288,844
Patented Nov. 29, 1966

3,288,844
LOWER-ALKYL CARBAMATES OF ALKANOYL-SALICYLANILIDES
Richard S. P. Hsi, Kalamazoo, Mich., assignor to The Upjohn Company, Kalamazoo, Mich., a corporation of Delaware
No Drawing. Filed Jan. 13, 1964, Ser. No. 337,184
3 Claims. (Cl. 260—480)

This invention relates to new and useful chemical compounds and more particularly to lower-alkylcarbamates of alkanoylsalicylanilides which are useful as anti-inflammatory and insecticidal agents.

The novel compounds of the present invention and the process of production thereof can be illustratively represented by the following structural formulae:

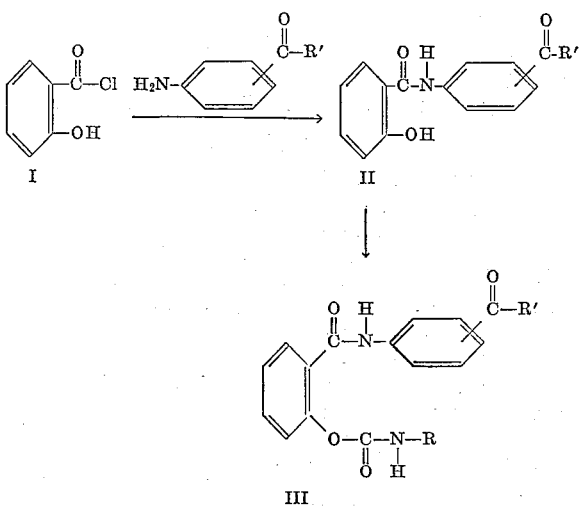

wherein R is a lower-alkyl having from 1 to 6 carbon atoms, inclusive, and R' is a lower-alkyl having from 1 to 4 carbon atoms, inclusive.

Representative for the parameter R' are the groups methyl, ethyl, propyl, isopropyl, butyl, isobutyl, and the like; representative for the parameter R are the groups methyl, ethyl, propyl, isopropyl, butyl, isobutyl, pentyl, isopentyl, hexyl, 2-methylpentyl, 3-methylpentyl, 2,2-dimethylbutyl, 2-3-dimethylbutyl, and the like.

The novel compounds of this invention having Formula III have demonstrated anti-inflammatory activity as shown by the granuloma pouch tests in rats.

These compounds are therefore useful in the preparation of a wide variety of pharmaceutical compositions, particularly in unit dosage form, each unit containing a predetermined amount of the therapeutic compound of the present invention for oral, topical and parenteral administration. For oral administration compositions can be used in the form of tablets, pills, capsules, boluses, feed granules, elixirs, syrups and the like. For topical administration the compounds of Formula III can be used in the form of ointments, creams, lotions, sprays, solutions, suspensions or powders, while for parenteral administration sterile solutions and suspensions can be prepared in vehicles containing water, ethanol, glycerol, polyalkylene glycols, vegetable oils, and the like.

The compositions, in the appropriate form, can be administered orally and parenterally for systemic treatment, applied topically for local treatment, or administered parenterally for local treatment, such as injection into the joint cavity, tendon sheath and bursa.

The compositions provide the veterinarian with a method for treating inflammations in large and small mammals, birds and fish. The mammals, birds and fish thus treated can be animals raised commercially for profit as well as animals kept for pets or research. Inflammatory conditions which can be treated include, but are not limited to, enteritis, rheumatoid and traumatic arthritis, osteoarthritis, tenosynovitis, bursitis and the like. Also, dermatitis of various origins can be treated.

The compounds also have insecticidal properties. For application as insecticides the compounds of Formula III are formulated into compositions adapted to insecticidal use.

The compounds have further been shown to possess antiviral (e.g., against Newcastle disease virus) and cytotoxic activities and can be used in suitable formulations against viral infections.

The starting materials 2'-, 3'-, and 4'-alkanoylsalicylanilides, are prepared by reacting salicyloyl chloride with 2'-, 3'-, and 4'-aminoalkanoylphenones as shown in detail in the Preparations.

In carrying out the process of the present invention, a selected alkanoylsalicylanilide is reacted in an inert organic solvent with a selected alkyl isocyanate. Inert solvents used in the reaction can be pyridine, toluene, benzene, diethyl ether, diisopropyl ether, dioxane, tetrahydrofuran or the like. In the preferred embodiment of this invention the reactants are mixed in equimolecular ratio or the alkyl isocyanate is used in slight excess (10 to 50% above equimolecular proportion). Larger ratios or smaller ratios of starting materials and alkyl isocyanate are operative, but do not provide any advantages. The reaction proceeds at temperatures between about 15 and about 100° C. and can be accelerated by adding a small amount of a base such as triethylamine or using a slightly basic solvent such as pyridine. The time of the reaction is between several hours and 1 week or more. At room temperature, usually from 12 hours to 4 days is required for the reaction to proceed to termination. The product is recovered by conventional means, such as filtration or concentration followed by filtration of the reaction mixture. The resulting product is purified by conventional means such as washing and recrystallizing of the precipitate.

PREPARATION 1.—4'-acetylsalicylanilide

A solution of 19 g. (0.12 mole) of salicyloyl chloride in 20 ml. of dry tetrahydrofuran was added dropwise with stirring to a solution of 4'-aminoacetophenone (33.85 g., 0.25 mole) in 100 ml. of dry tetrahydrofuran. The mixture was stirred and kept at room temperature (23 to 25° C.) overnight. The solvent was then removed at reduced pressure and the residue washed with water. The water-insoluble crude product was recrystallized from 900 ml. of absolute ethanol to give 27.10 g. (88.6%) of 4'-acetylsalicylanilide of melting point 205–207° C.

Analysis: Calcd. for $C_{15}H_{13}NO_3$: C, 70.58; H, 5.13; N, 5.49. Found: C, 70.56; H, 4.92; N, 5.56.

PREPARATION 2.—3'-acetylsalicylanilide

Similarly to Preparation 1, salicyloyl chloride in dry tetrahydrofuran was reacted with 3'-aminoacetophenone in the same solvent. The material was recovered from the reaction mixture by removal of the solvent; it was then washed and recrystallized to give 3'-acetylsalicylanilide.

PREPARATION 3.—2'-propionylsalicylanilide

In the manner given in Preparation 1, reacting salicyloyl chloride with 2'-aminopropiophenone in tetrahydrofuran, gave 2'-propionylsalicylanilide.

PREPARATION 4.—4'-butyrylsalicylanilide

In the manner given in Preparation 1, reacting salicyloyl chloride with 4'-aminobutyrophenone gave 4'-butyrylsalicylanilide.

In the same manner as shown in Preparations 1 through 4, other alkanoylsalicylanilides can be made, such as 2'-acetylsalicylanilide [see Bogert et al., J. Am. Chem. Soc. 49, 2650 (1927)], 3'- and 4-propionylsalicylanilide, 2'- and 3'-butyrylsalicylanilide, 2'-, 3'-, and 4'-isobutyrylsalicylanilide, 4'-valerylsalicylanilide, and the like.

EXAMPLE 1

Methylcarbamate of 4'-acetylsalicylanilide

Eleven milliliters of a 51% solution of methyl isocyanate in toluene (0.066 mole of methyl isocyanate) was added to a solution of 4'-acetylsalicylanilide (12.76 g., 0.05 mole) in 60 ml. of dry pyridine. The mixture was kept at room temperature overnight and then diluted with absolute ether. A crystalline precipitate formed, which was recovered on a filter and washed with ether, giving a total of 14.15 g. of methylcarbamate of 4'-acetylsalicylanilide (90.7%) of melting point 204–205.5° C. and having an analysis as follows:

Analysis: Calcd. for $C_{17}H_{16}N_2O_4$: C, 65.37; H, 5.16; N, 8.97. Found: C, 65.37; H, 5.35; N, 8.56.

EXAMPLE 2

Ethylcarbamate of 4'-acetylsalicylanilide

In the manner given in Example 1, ethyl isocyanate in toluene solution and 4'-acetylsalicylanilide in pyridine were allowed to react at room temperature over a period of 24 hours to give the ethylcarbamate of 4'-acetylsalicylanilide.

EXAMPLE 3

Butylcarbamate of 4'-acetylsalicylanilide

Butyl isocyanate in diisopropyl ether was reacted with 4'-acetylsalicylanilide in the presence of triethylamine. The reaction mixture was worked up as in Example 1 to give butylcarbamate of 4'-acetylsalicylanilide.

EXAMPLE 4

Hexylcarbamate of 4'-acetylsalicylanilide

Hexyl isocyanate in toluene solution was reacted with 4'-acetylsalicylanilide in pyridine solution. The mixture was allowed to stand for 36 hours and was then filtered and the product thus obtained washed with ether and recrystallized twice to give pure hexylcarbamate of 4'-acetylsalicylanilide.

EXAMPLE 5

Methylcarbamate of 3'-acetylsalicylanilide

In the manner given in Example 1, methyl isocyanate solution in toluene was reacted with a pyridine solution of 3'-acetylsalicylanilide to give methylcarbamate of 3'-acetylsalicylanilide.

EXAMPLE 6

Propylcarbamate of 3'-acetylsalicylanilide

Propyl isocyanate in diisopropyl ether was reacted with a solution of 3'-acetylsalicylanilide in the same solvent and in the presence of triethylamine. The mixture was heated to 50° C. for a period of 6 hours, was then allowed to cool, and was filtered. The product, after recrystallization, was pure propylcarbamate of 3'-acetylsalicylanilide.

EXAMPLE 7

Pentylcarbamate of 3'-acetylsalicylanilide

In the manner given in Example 1, pentyl isocyanate in toluene solution was reacted with a pyridine solution of 3'-acetylsalicylanilide to give pentylcarbamate of 3'-acetylsalicylanilide.

EXAMPLE 8

Methylcarbamate of 2'-acetylsalicylanilide

In the manner given in Example 1, methyl isocyanate was reacted with 2'-acetylsalicylanilide to give the methylcarbamate of 2'-acetylsalicylanilide.

EXAMPLE 9

Hexylcarbamate of 2'-acetylsalicylanilide

In the manner given in Example 1, hexyl isocyanate in toluene solution was reacted with 2'-acetylsalicylanilide in pyridine solution to give hexylcarbamate of 2'-acetylsalicylanilide.

EXAMPLE 10

Methylcarbamate of 2'-propionylsalicylanilide

In the manner given in Example 1, methyl isocyanate in toluene solution was reacted with 2'-propionylsalicylanilide to give the methylcarbamate of 2'-propionylsalicylanilide.

EXAMPLE 11

Propylcarbamate of 3'-propionylsalicylanilide

Propyl isocyanate in diisopropyl ether was reacted with 3'-propinoylsalicylanilide in the presence of triethylamine. The mixture, after concentrating to half-volume, was cooled and filtered and the precipitated material recrystallized to give propylcarbamate of 3'-propionylsalicylanilide.

EXAMPLE 12

Butylcarbamate of 3'-propionylsalicylanilide

Butyl isocyanate in toluene solution was reacted with a pyridine solution of 3'-propionylsalicylanilide to give the butylcarbamate of 3'-propionylsalicylanilide.

In the same manner given in Example 1, other alkylcarbamates of alkanoylsalicylanilides are produced by reacting a selected alkyl isocyanate with a selected alkanoylsalicylanilide. Representative compounds thus produced include the methylcarbamate of 4'-butyrylsalicylanilide, of 4'-isobutyrylsalicylanilide, of 4'-propionylsalicylanilide; the ethylcarbamate of 3'-propionylsalicylanilide, of 3'-isobutyrylsalicylanilide, of 2'-butyrylsalicylanilide; the propylcarbamate of 3'-butyrylsalicylanilide; the butylcarbamate of 4'-butyrylsalicylanilide; the hexylcarbamate of 4'-butyrylsalicylanilide and of 4'-propionylsalicylanilide; the methylcarbamate of 4'-valerylsalicylanilide, and the like.

I claim:
1. An alkylcarbamate of alkanoylsalicylanilide of the formula:

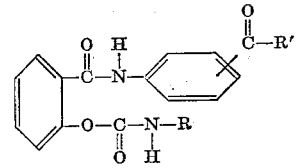

wherein R is a lower-alkyl having from 1 to 6 carbon atoms, inclusive, and wherein R' is a lower-alkyl having from 1 to 4 carbon atoms, inclusive.

2. Methylcarbamate of 4'-acetylsalicylanilide.
3. Methylcarbamate of 2'-acetylsalicylanilide.

References Cited by the Examiner

UNITED STATES PATENTS 2,764,614   9/1956   Meyer _____ 260—480
3,091,633   5/1963   Strube _____ 260—480

OTHER REFERENCES

Weizmann et al.: Journal of Organic Chemistry, vol. 13, pages 796–798 (1948).

LORRAINE A. WEINBERGER, Primary Examiner.

DANIEL D. HORWITZ, Examiner.

I. R. PELLMAN, Assistant Examiner.